(No Model.)
C. H. FARLEY.
EYEGLASSES.
No. 373,349. Patented Nov. 15, 1887.
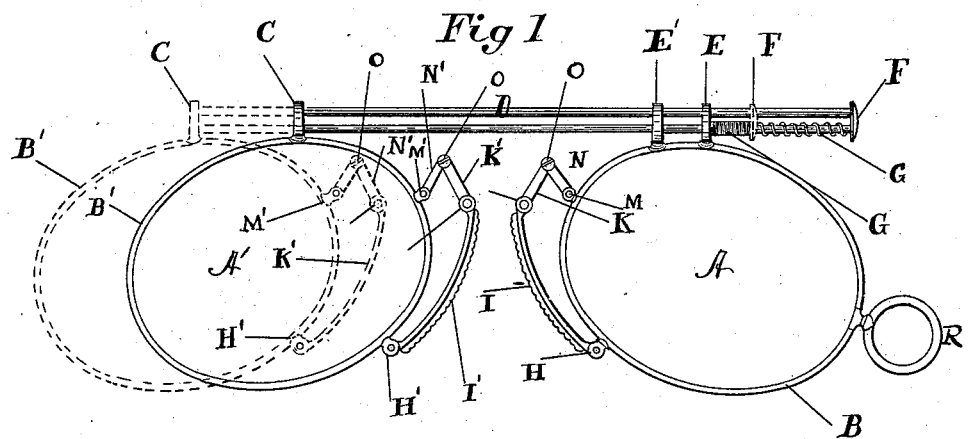
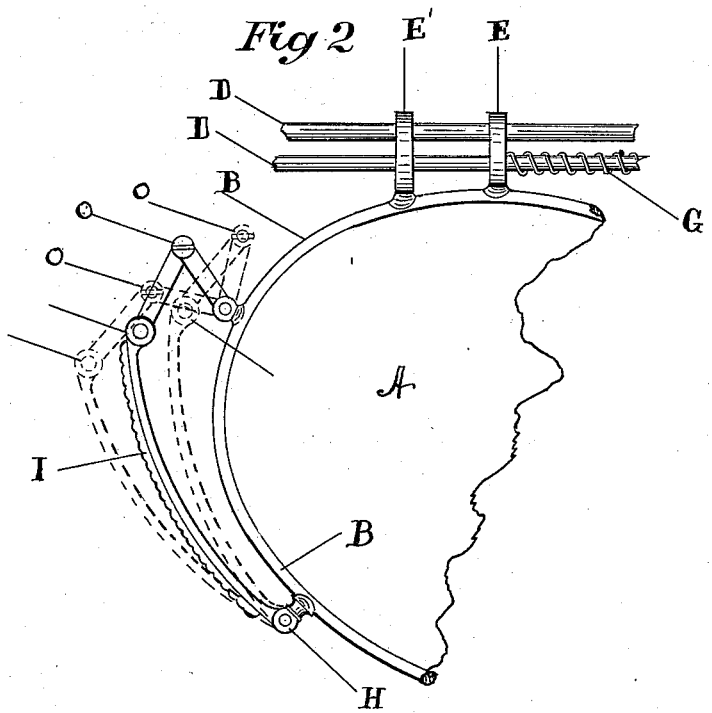
Witnesses:
Herbert G. Briggs
Frank S. Waterhouse
Inventor.
Cyrus H. Farley

UNITED STATES PATENT OFFICE.

CYRUS H. FARLEY, OF PORTLAND, MAINE.

EYEGLASSES.

SPECIFICATION forming part of Letters Patent No. 373,349, dated November 15, 1887.

Application filed February 25, 1886. Serial No. 193,158. (No model.)

*To all whom it may concern:*

Be it known that I, CYRUS H. FARLEY, residing at Portland, in the county of Cumberland and State of Maine, have invented certain new and useful Improvements in Eyeglasses; and I do hereby declare that the following is a full, clear, and exact description of the invention, which will enable others skilled in the art to which it appertains to make and use the same.

Figure 1 is a front elevation of the glasses ready to be applied to the eyes. Fig. 2 is an enlarged detail to show more plainly the novel point in construction.

The accompanying drawings, forming a part of this specification, show the construction and operation of my newly-devised eyeglass-frame.

The object of my present invention is to provide an eyeglass-frame so constructed that the lenses can be separated in a straight line.

Another object of my invention is to augment the usefulness of eyeglass-frames by the connection with them of nose clamps or grips that can be adjusted to fit any nose or any abnormal development of the same.

It is difficult, and in some cases impossible, for people afflicted with certain deformities of the eye to wear cylindrical lenses so mounted that there is at any time the least deviation of the axes of the lenses from the line of vision. For this reason many who desire to wear spring-bowed eyeglasses instead of spectacles are obliged to use spectacles, because in the use of the spring-bows the lenses open on a curve and the axes change with every movement of opening or shutting and a slight change of position will very materially impair and disturb the vision. By my construction the above difficulty is obviated, because the lenses, instead of moving on a curve separate from each other in a straight line and the axes of the lenses, always keep in a uniform position or angle, the same as in spectacles.

I will first describe my invention in connection with all that is necessary to the full and complete knowledge thereof, and then indicate in the claims the parts believed to be new.

Referring to the drawings, the letters A A' indicate the lenses of an eyeglass. These lenses are the common elliptical or circular shaped lenses, and, in accordance with ordinary construction, are mounted in rims B B'. At the top of the rim B' is firmly set a short offset or standard, C. Attached to this standard and standing at right angles to it are two parallel bars, D D.

E E' are standards affixed to the other rim, B. These standards E E' are provided with orifices or holes to fit over the parallel bars D D. The ends of the bars opposite the standard C are provided with an end piece or stop, F. Compressed between the stop F and the outer standard, E, is seen a spiral spring, G, surrounding the lower bar D.

Referring again to the drawings, there is seen a novel attachment for clamping the glasses to the wearer's nose. This consists, essentially, of a bar attached on the inner sides of the rims, and so as to be movable back or forth in line or in the same plane with the rims. Attached to the rims B B' are offsets H H'. Pivotally connected to these offsets are bars I I', which at their tops are again pivotally connected to other bars, K K'.

M M' are offsets, also affixed to the rims B B'. N N' are bars pivotally connected to the offsets M M'. The bars N N' and K K' come together at the points O, where they are united and held securely together by means of clamping-screws, by means of which the bars can be adjusted at any desired angle and the position made permanent by driving the screws tightly home. This arrangement I have adopted for the purpose of adjusting the glasses so as to fit noses of different slopes. Thus, in case the wearer has any deformity of the nose, whereby one side is on a different slope from the other, he can, by adjusting the two sides, make the nose-clamp fit exactly over the bridge of his nose, so as to hold the glasses in a horizontal position.

The use of my invention is very simple. I will describe its operation, assuming that the operator is a right-handed person. The tip or handle R is grasped between the thumb and second finger of the right hand. The glasses are raised to the face. The clamp-bar I is pressed against the right side of the nose. The tip of the right forefinger is now placed against the stop F. A slight pressure exerted by the forefinger compresses the spring G between the standard E and stop F. This causes the left-hand lens to move on a direct straight line away from the right-hand lens, as indicated in the drawings by the dotted outlining. The bar I' is now brought to position against the left side of the nose. As soon as the forefinger's tip is removed from the end of the bar D, the expansive force of the compressed spring C tends to draw the lenses together. The expansive force of the spring C is intended to be just sufficient to give the nose an easy pinch, about the same as that exerted by the ordinary spring-bow.

The advantages of my newly-devised eyeglass-frame are several: First, by its use the optician is able to set glasses from prescription as accurately as in spectacle-frames; second, in placing the frame upon the nose the lenses separate laterally in a straight line, and therefore the angle of the axes of the lenses is not changed; third, the pupillary distance of the lenses can be easily obtained with accuracy.

Other advantages might be enumerated; but sufficient has been shown to prove that my invention is of great utility.

What I claim as my invention, and desire to secure by Letters Patent, is—

1. In combination with the rim B, provided with the standards E and E', and the rim B', provided with the standard C, the bars D, spring G, and the stop F, substantially as shown and described, whereby the lenses may be separated on a right line and automatically clamped on the nose.

2. In combination with the lenses, the mechanism for pinching the nose, the same consisting of bars pivotally connected to the frames and adjustable and movable on the same plane with the rims, substantially as described, so that the glasses can be made to fit any sized nose.

3. In combination with the frames, each provided with pivoted and adjustable bars for pinching the nose, the bars D, connected and operating in connection with standards upon each frame, and spring mechanism, whereby they are automatically adjustable upon the nose.

4. In eyeglasses, the combination of the bar D, spring G, and adjustable pinching mechanism, substantially as herein set forth and specified.

In testimony that I claim the foregoing as my own I have affixed my signature in the presence of two witnesses.

CYRUS H. FARLEY.

Witnesses:
HAVEN F. WINE,
HERBERT G. BRIGGS.